US012290865B2

United States Patent
Sanders et al.

(10) Patent No.: US 12,290,865 B2
(45) Date of Patent: May 6, 2025

(54) MILLING TOOL AND METHOD FOR PRODUCING A ROLLING BEARING CAGE

(71) Applicant: Schaeffler Technologies AG & Co. KG, Herzogenaurach (DE)

(72) Inventors: Bernhard Sanders, Roßtal (DE); Stefan Conrad, Brasov (RO)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 596 days.

(21) Appl. No.: 17/603,358

(22) PCT Filed: Mar. 25, 2020

(86) PCT No.: PCT/DE2020/100235
§ 371 (c)(1),
(2) Date: Oct. 13, 2021

(87) PCT Pub. No.: WO2020/228882
PCT Pub. Date: Nov. 19, 2020

(65) Prior Publication Data
US 2022/0203461 A1    Jun. 30, 2022

(30) Foreign Application Priority Data

May 13, 2019    (DE) ..................... 10 2019 112 405.0

(51) Int. Cl.
*B23C 5/10*    (2006.01)
*B23C 5/22*    (2006.01)
(Continued)

(52) U.S. Cl.
CPC ............ *B23C 5/109* (2013.01); *B23C 5/2208* (2013.01); *B23C 5/2462* (2013.01);
(Continued)

(58) Field of Classification Search
CPC ..... B23C 5/109; B23C 5/2208; B23C 5/2462; B23C 2200/367; B23C 2210/084;
(Continued)

(56) References Cited

U.S. PATENT DOCUMENTS 4,194,860 A * 3/1980 Hopkins ............... B23C 5/2213
407/42
4,335,983 A * 6/1982 Wermeister .......... B23C 5/2265
407/41

(Continued)

FOREIGN PATENT DOCUMENTS

CN    103008977 A    4/2013
CN    103042267 A    4/2013
(Continued)

*Primary Examiner* — Sara Addisu

(57) ABSTRACT

A milling tool includes a main body and a plurality of cutting inserts with respective cutting edges. The main body has an end face and a barrel-shaped curved lateral face. A first group of the plurality of cutting inserts are fastened on the end face, a second group of the plurality of cutting inserts are fastened on the barrel-shaped curved lateral face, and the respective cutting edges describe a barrel shape. Each one of the plurality of cutting inserts may be designed as an indexable insert.

10 Claims, 2 Drawing Sheets

(51) Int. Cl.
  *B23C 5/24* (2006.01)
  *B23P 15/00* (2006.01)
  *F16C 23/08* (2006.01)
  *F16C 33/49* (2006.01)

(52) U.S. Cl.
  CPC .......... *B23P 15/003* (2013.01); *F16C 23/086* (2013.01); *F16C 33/497* (2013.01); *B23C 2200/367* (2013.01); *B23C 2210/084* (2013.01); *B23C 2260/08* (2013.01); *F16C 2220/66* (2013.01)

(58) Field of Classification Search
  CPC ... B23C 5/24; B23C 2260/08; F16C 2220/66; F16C 23/08; F16C 23/086; F16C 33/497; B23P 15/003
  See application file for complete search history.

(56) References Cited

U.S. PATENT DOCUMENTS

| | | | | | |
|---|---|---|---|---|---|
| 4,618,296 | A | * | 10/1986 | Allaire | B23C 5/1027 407/62 |
| 4,789,273 | A | * | 12/1988 | Wiacek | B23C 5/2213 407/42 |
| 4,927,303 | A | * | 5/1990 | Tsujimura | B23C 5/1027 407/42 |
| 5,741,095 | A | * | 4/1998 | Charron | B23C 5/2213 407/53 |
| 6,109,838 | A | * | 8/2000 | Riviere | B23C 5/2213 407/113 |
| 6,132,146 | A | * | 10/2000 | Satran | B23B 51/00 407/56 |
| 6,270,292 | B1 | * | 8/2001 | Satran | B23C 5/2204 407/42 |
| 6,684,742 | B1 | * | 2/2004 | White | B23C 5/10 82/1.11 |
| 6,939,090 | B1 | * | 9/2005 | Nagaya | B23C 5/109 407/115 |
| 7,862,263 | B2 | * | 1/2011 | van Iperen | B23C 5/10 407/54 |
| 8,142,119 | B2 | * | 3/2012 | Volokh | B23C 3/02 407/53 |
| 8,961,075 | B2 | * | 2/2015 | Sagstrom | B23F 21/128 407/30 |
| 9,782,842 | B2 | * | 10/2017 | Horiguchi | B23C 5/1027 |
| 10,112,240 | B2 | * | 10/2018 | Li | B23C 3/12 |
| 10,213,851 | B2 | * | 2/2019 | Koike | B23C 5/2213 |
| 10,661,361 | B2 | * | 5/2020 | Uenishi | B23B 29/24 |
| 11,351,618 | B2 | * | 6/2022 | Brambs | B23C 5/1009 |
| 2002/0098047 | A1 | * | 7/2002 | Norris | B23C 5/1072 407/35 |
| 2003/0053872 | A1 | | 3/2003 | Schlagenhauf | |
| 2009/0245959 | A1 | * | 10/2009 | Hollmann | B23P 15/006 407/30 |
| 2010/0226729 | A1 | * | 9/2010 | Schneider | B23C 5/14 409/234 |
| 2011/0024200 | A1 | | 2/2011 | DiGiovanni et al. | |
| 2012/0076596 | A1 | | 3/2012 | Kim et al. | |
| 2012/0170985 | A1 | * | 7/2012 | Hill | B23C 5/10 451/48 |
| 2015/0037107 | A1 | * | 2/2015 | Buob | B23C 5/24 407/44 |
| 2016/0193670 | A1 | * | 7/2016 | Kopton | B23C 5/06 407/42 |
| 2017/0232533 | A1 | * | 8/2017 | Crespin | B23C 5/2226 407/44 |

FOREIGN PATENT DOCUMENTS

| | | |
|---|---|---|
| CN | 205823947 U | 12/2016 |
| CN | 106270691 A | 1/2017 |
| DE | 1752586 C3 | 6/1978 |
| DE | 29911894 U1 | 9/1999 |
| DE | 10218991 A1 | 11/2003 |
| DE | 10340493 B4 | 4/2005 |
| DE | 102007057550 A1 | 6/2009 |
| DE | 102011003211 A1 | 7/2012 |
| DE | 102011078840 A1 | 1/2013 |
| DE | 102012212440 A1 | 1/2014 |
| DE | 102016217533 A1 | 3/2017 |
| DE | 102017118738 A1 | 2/2019 |
| EP | 1816362 A1 | 8/2007 |
| EP | 1289702 B1 | 3/2009 |
| EP | 2093012 A2 | 8/2009 |
| GB | 1323272 A | 7/1973 |
| JP | S6328505 A | 2/1988 |
| JP | H04087021 U | 7/1992 |
| JP | H10138029 A | 5/1998 |
| JP | 2002520168 A | 7/2002 |
| JP | 2004090181 A | 3/2004 |
| JP | 2005074623 A | 3/2005 |
| JP | 2007198530 A | 8/2007 |
| JP | 2007276075 A | 10/2007 |
| JP | 2015027707 A | 2/2015 |
| WO | 2018123428 A1 | 7/2018 |

\* cited by examiner

MILLING TOOL AND METHOD FOR PRODUCING A ROLLING BEARING CAGE

CROSS-REFERENCE TO RELATED APPLICATIONS

This application is the United States National Phase of PCT Appln. No. PCT/DE2020/100235 filed Mar. 25, 2020, which claims priority to German Application No. DE102019112405.0 filed May 13, 2019, the entire disclosures of which are incorporated by reference herein.

TECHNICAL FIELD

The present disclosure relates to a milling tool. The disclosure further relates to a method for producing a rolling bearing cage designed as a comb-type cage.

BACKGROUND

A generic milling tool is known for example from DE 17 52 586 C3. It is a cylindrical or profile milling cutter. A main body is fastened to a milling spindle by means of a feather key. A cutting ring, in which individual indexable inserts are held in an adjustable manner, is in turn fastened to the main body. The cylindrical or profile milling cutter according to DE 17 52 586 C3 is intended to be particularly suitable for machining flat or profiled surfaces, for example guideways.

A further example of a milling cutter having indexable inserts is disclosed in DE 10 2016 217 533 A1. In this case, a defined cycle of cutting inserts is provided.

DE 10 2012 212 440 A1 describes a drilling tool which is intended to be particularly suitable for machining components made of a titanium alloy. A plurality of cutting inserts is located on one end face of the drilling tool.

EP 1 289 702 B1 discloses a method for the milling cutting of fishbone-type notches. First of all, a preform is to be milled in three processing stages using an end-milling cutter equipped with hard metal.

DE 10 2017 118 738 A1 discloses a milling tool and a method for producing a comb-type cage. A main cutting edge and a secondary cutting edge are provided by the milling tool, a cutting edge of the main cutting edge and/or secondary cutting edge being interrupted so that at least one free space is formed.

SUMMARY

In a basic concept known per se, the milling tool includes a main body to Which cutting inserts are fastened, each of which having at least one cutting edge. According to the present disclosure, the cutting edges describe a barrel shape overall. A first group of cutting inserts are arranged on an end face of the main body and a second group of cutting inserts are arranged on a barrel-shaped curved lateral face of the main body.

The barrel shape, which is described as a whole by the cutting edges, represents an approximation of the shape of the rolling elements to be guided in the comb-type cage, namely barrel rollers. In this way, a number of material-removing machining processes are omitted, as described, for example, in the cited EP 1 289 702 B1.

In general, the material-removing machining process with which the comb-type cage is produced includes the following steps:

Providing a cage blank, e.g., made of non-ferrous metal, which already has the basic shape of the later comb-type cage, Carrying out a first material-removing machining process to produce a barrel-shaped receiving opening in the cage blank by means of a milling tool according to the disclosure, and Post-processing the barrel-shaped receiving opening in a second material-removing machining process so that the receiving opening is suitable for guiding a barrel roller as a rolling element.

In an example method, the pocket bottom of the rolling element pocket to be produced is already machined to the finished size in the first material-removing machining process. In contrast, in the second material-removing machining process, only the barrel-shaped wall of the receiving opening, i.e., the later rolling element pocket, is machined. For this purpose, a cutting allowance of 0.5 mm is used in the first material-removing machining process, for example.

In an example embodiment, the cutting inserts of the milling tool are indexable inserts. The indexable inserts can be made of any materials that are usually used for the manufacture of cutting inserts, for example hard metal or ceramic materials. To enable precise finishing of the pocket bottom in the first material-removing machining process, that is, in the machining process carried out with the milling tool according to the disclosure, the cutting inserts may be adjustable on the end face of the main body. With regard to possibilities for setting cutting inserts of a cutting tool, reference is also made to DE 103 40 493 B4.

In contrast to the cutting inserts on the end face of the main body, with which the pocket bottom of the rolling element pocket is produced, the cutting inserts are fixed on the lateral face of the milling tool according to a possible, simply constructed configuration with an unchangeable setting on the main body. According to an alternative, somewhat more complex embodiment, the cutting inserts on the lateral face of the milling tool are also adjustable. In both cases, the geometrical design of the cutting inserts on the curved lateral face of the milling tool may deviate from the design of the cutting inserts on the end face.

The milling tool may be used to machine a cage of a double-row spherical roller bearing. Such spherical roller bearings are used, for example, in industrial plants and in wind power plants. In this context, reference is made to DE 10 2011 078 840 A1 as an example.

BRIEF DESCRIPTION OF THE DRAWINGS

In the following, an exemplary embodiment is explained in more detail by means of a drawing. Here, each in a schematic representation.

DETAILED DESCRIPTION

Figure 1:
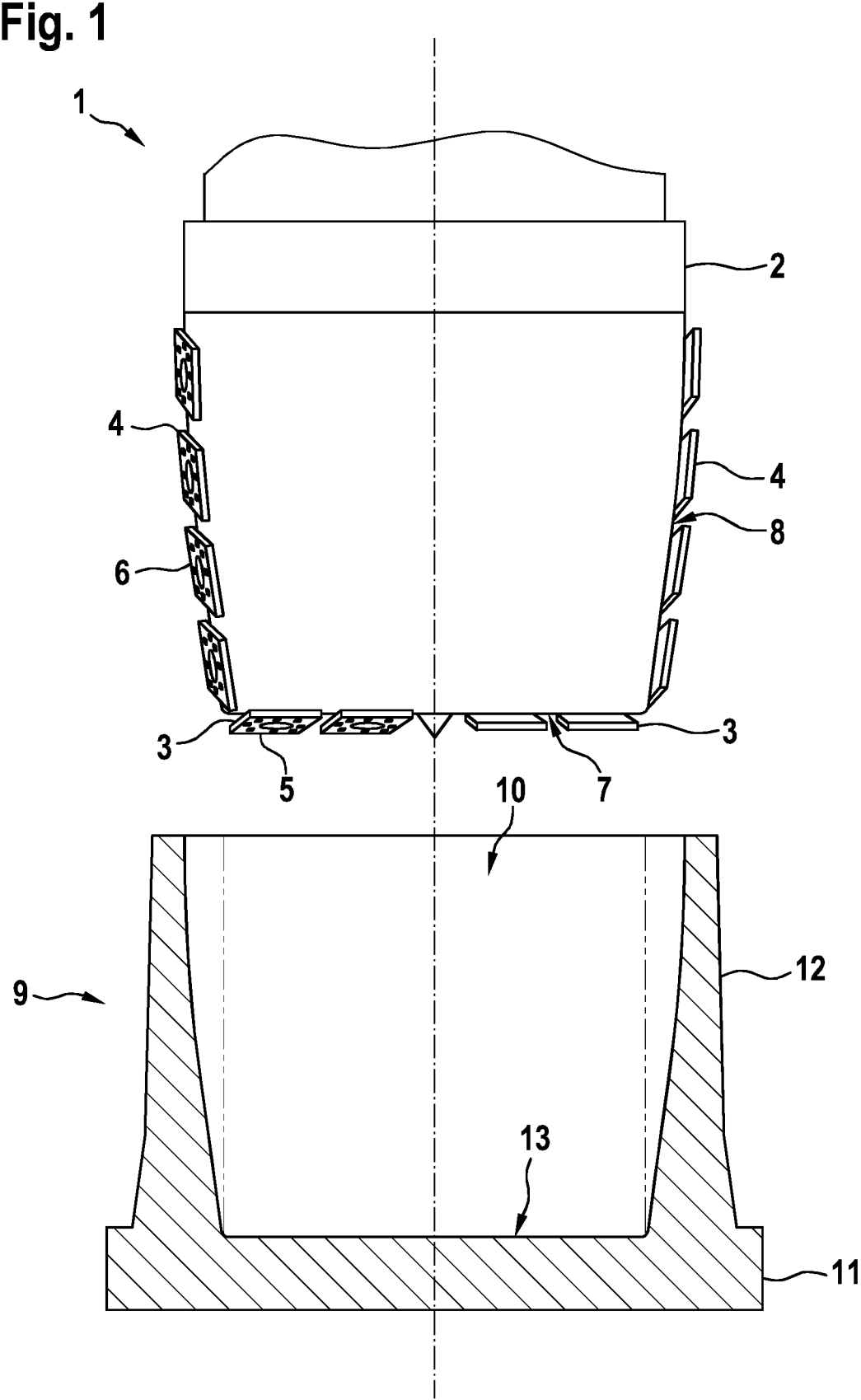
FIG. 1 shows a first processing step for the production of a rolling bearing cage designed as a comb-type cage.

A milling tool 1, shown in simplified form in FIG. 1, is designed as a profile milling cutter having an essentially cylindrical, generally barrel-shaped profiled main body 2. Multiple cutting inserts 3, namely indexable inserts, are fastened to the flat end face of the main body 2, designated by 7. Cutting inserts 4 are fastened to the curved lateral face of the main body 2, designated by 8. The shape of the cutting inserts 4 does not necessarily match the shape of the cutting inserts 3. Cutting edges of the end-face cutting inserts 3 are designated by 5; cutting edges of the cutting inserts 4 are designated by 6.

Through the entirety of the cutting edges 6 on the barrel-shaped lateral face 8 and the cutting edges 5 on the end face 7 of the milling tool 1, a barrel shape is described overall which, to a good approximation, corresponds to the barrel shape of rolling elements, i.e., barrel rollers, which are guided into a comb-type cage 16 to be produced for a double row spherical roller bearing.

In the manufacture of the rolling bearing cage 16, that is to say the comb-type cage, a cage blank 9 as illustrated in FIG. 1 is assumed. In a first material-removing machining process, a barrel-shaped receptacle 10 is produced in the cage blank 9 by means of the milling tool 1. The cage blank 9 has a cage ring 11, which is also present in the later comb-type cage 16 in largely unchanged form. Individual webs 12 are formed to extend from the cage ring 11 in the axial direction between which barrel-shaped receiving openings 10, that is to say the later rolling element pockets.

Already in the first material-removing machining process, a pocket bottom, designated 13, of the barrel-shaped receptacle 10 is machined to the finished size thereof. The curved walls of the barrel-shaped receptacle 10, on the other hand, are initially produced by the milling tool 1 with an allowance of, for example, 0.5 mm. The machining carried out with the milling tool 1 therefore represents a pre-machining of the cage blank 9.

Despite the character of the machining carried out with the milling tool 1 as pre-machining, as far as the pocket bottom 13 is concerned, the geometric precision achieved therewith is already sufficiently high at this point to be able to dispense with material-removing post-machining. To achieve the required precision, the cutting inserts 3 arranged on the end face 7 are adjustable.

Figure 2:
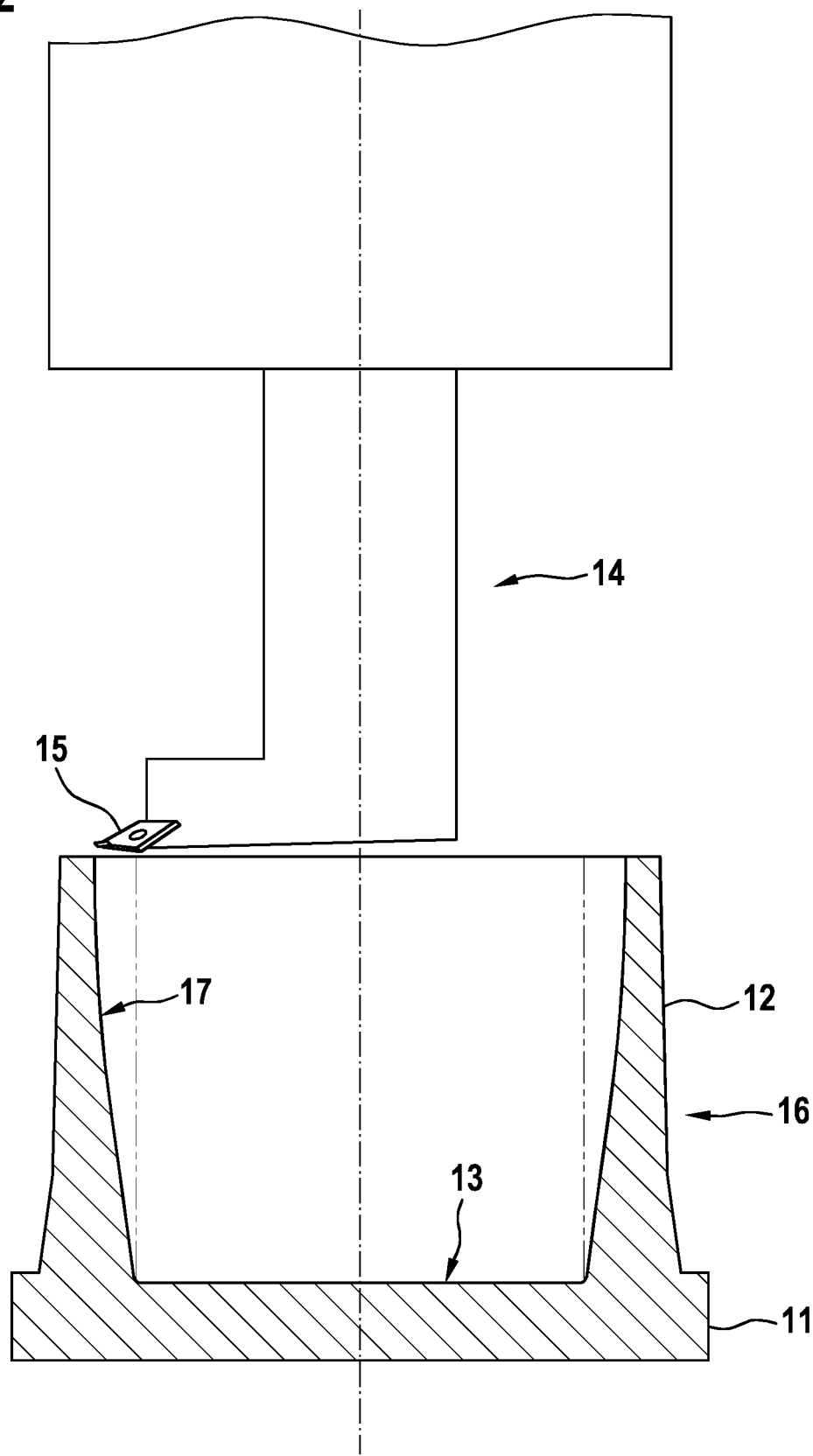
FIG. 2 shows a second processing step for producing the rolling bearing cage.

In contrast to the front-side cutting inserts 3, the cutting inserts 4 are held in a fixed, non-adjustable position on the main body 2. For the finishing of the pocket wall, which is designated by 17 and has a spherically curved cross-section, a machining device 14 is used which is indicated only in FIG. 2 and which is also referred to as a control tool. A cutting insert 15 can be seen, which is assigned to the machining device 14 and is used in a second material-removing machining process in which only the pocket wall 17 is machined. The second material-removing machining process can take place either in the same setting as the first material-removing machining process or in a separate setting.

In both cases, the good approximation of the shape of the milling tool 1 to the profile of the rolling elements to be guided in the comb-type cage 16 results in efficient material-removing machining. The comb-type cage 16 is made, for example, from a non-ferrous metal alloy.

REFERENCE NUMERALS

1 Milling tool
2 Main body
3 Cutting insert on the end face
4 Cutting insert on the lateral face
5 Cutting edge
6 Cutting edge
7 End face
8 Lateral face
9 Cage blank
10 Receiving opening
11 Cage ring
12 Web
13 Pocket bottom
14 Machining device
15 Cutting insert
16 Comb-type cage, rolling bearing cage
17 Pocket wall

The invention claimed is:

1. A milling tool comprising:
a main body comprising:
    a flat end face; and
    a curved lateral face;
a plurality of cutting inserts comprising respective cutting edges, wherein:
    a first group of the plurality of cutting inserts are fastened on the end face;
    a second group of the plurality of cutting inserts are fastened on the curved lateral face; and
    respective surfaces of each of the first group of the plurality of cutting inserts facing the flat end face are arranged at an angle relative to the flat end face.

2. The milling tool of claim 1 wherein each one of the plurality of cutting inserts is designed as an indexable insert.

3. The milling tool of claim 1 wherein each one of the plurality of cutting inserts in the second group of the plurality of cutting inserts is fixed with an unchangeable setting on the curved lateral face.

4. The milling tool of claim 1 further comprising a rotational axis, wherein the flat end face is orthogonal to the rotational axis.

5. The milling tool of claim 1 further comprising a rotational axis, wherein the respective cutting edges of the first group of the plurality of cutting inserts define a plane orthogonal to the rotational axis.

6. The milling tool of claim 5, wherein respective surfaces of each of the first group of the plurality of cutting inserts facing the flat end face are arranged at an angle relative to the flat end face.

7. The milling tool of claim 1 wherein each one of the first group of the plurality of cutting inserts has a parallelogram shape.

8. The milling tool of claim 1 wherein each one of the second group of the plurality of cutting inserts has a parallelogram shape.

9. The milling tool of claim 1 wherein a diameter of the curved lateral face decreases as the curved lateral face approaches the flat end face.

10. A milling tool comprising:
a rotational axis;
a main body comprising:
    a flat end face; and
    a curved lateral face; and
a plurality of cutting inserts comprising respective cutting edges, wherein:
    a first group of the plurality of cutting inserts are fastened on the end face;
    a second group of the plurality of cutting inserts are fastened on the curved lateral face;
    the respective cutting edges of the first group of the plurality of cutting inserts define a plane orthogonal to the rotational axis; and
    respective surfaces of each of the first group of the plurality of cutting inserts facing the flat end face are not coplanar with the flat end face.

* * * * *